Oct. 5, 1965  A. E. JOSLIN  3,210,102

PIPE COUPLING HAVING A DEFORMED INNER LOCK

Filed July 22, 1964

INVENTOR
ALVIN E. JOSLIN

United States Patent Office 3,210,102
Patented Oct. 5, 1965

3,210,102
PIPE COUPLING HAVING A DEFORMED
INNER LOCK
Alvin Earl Joslin, 1559 Elite Road, Clarkson,
Ontario, Canada
Filed July 22, 1964, Ser. No. 384,420
7 Claims. (Cl. 285—374)

This is a continuation-in-part of application Serial No. 303,472, filed August 16, 1963 which is a continuation of application Serial No. 221,259, filed September 4, 1962, now abandoned.

This invention relates to methods of connecting lengths of pipe, and is particularly concerned with a pipe joint essentially formed by forcibly ramming the pipe together.

In my earlier application, I disclosed a method of joining pipe which was thought to have particular utility in connecting relatively thin walled aluminum pipe. It has now been found that the method is equally suitable to joining lengths of relatively thick walled pipe and to joining pipe formed of harder metals than aluminum. Thus, the pipe joint in accord with this invention can be used in connecting almost any type of metallic pipe from small diameter thick walled steel pipe to large diameter thin walled aluminum pipe. It is essential only that the pipe material possess a certain amount of malleability as to be capable of deforming as required as the joints are effected. This requirement, of course, does exclude cast iron and asbestos pipe from use with this invention.

One of the major cost items in any piping system is the labor and material costs involved in joining the pipe lengths together. Heretofore, there has been provided several different joining arrangements, most of which are characterized by a clamping ring of one type or another and some type of sealant which may take the form of a rubber gasket. These devices, as well as being expensive to manufacture and install, are not always effective in retaining a tight seal.

The joining method in accord with the invention is extremely simple and avoids most of the drawbacks of the prior joining arrangement. Essentially, this novel method consists of forming a small bell on one pipe end to be joined, rolling an annular groove in the other pipe end to be joined, and telescoping the latter pipe end inside the first with such force as to cause the second pipe end to buckle somewhat in the region of the annular groove, whereby it is forced outwardly against the inside wall of the belled pipe end. As an additional step the outside surface of the spigot end or the inside surface of the bell end is coated with a liquid sealant prior to the telescoping of the pipe ends. The sealant not only subsequently hardens to insure a good seal, but it also acts as a lubricant at the time the pipe ends are telescoped.

The invention will be more thoroughly understood from the following description of a preferred embodiment thereof as read in conjunction with the accompanying drawings.

Figure 2A:
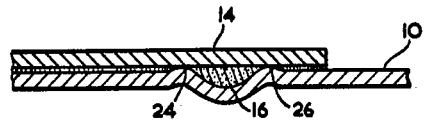
FIGURE 2a is an enlarged view of a portion of FIGURE 2.

The pipe illustrated in the drawings is aluminum pipe such as now commonly used in underground sprinkler systems for golf courses and the like. It is to be understood, however, that the pipe joint in accord with this invention is equally adaptable to any pipe material having a certain amount of malleability.

Figure 1:
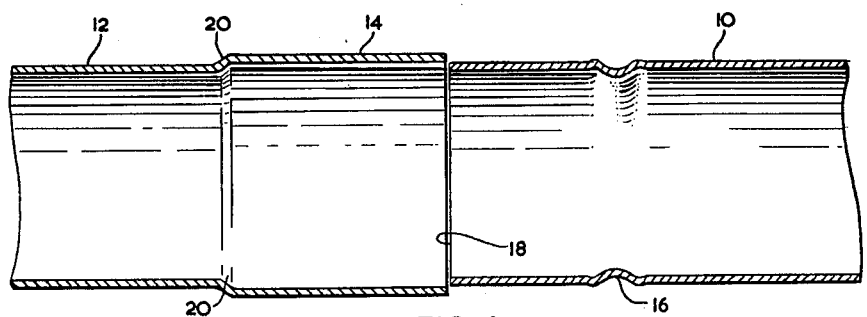
FIGURE 1 is a cross-sectional view taken along the longitudinal axis of two aligned pipe ends.

FIGURE 1 illustrates a male pipe end 10 and a female pipe end 12. In actual fact, however, both these pipe end constructions are derived from straight walled pipe with the bell portion 14 of the female pipe end 12 and the annular groove 16 in the male pipe end 10 being formed in the field at the time the joint is connected. Thus, bell 14 is developed by ramming a forming tool forcibly into a straight pipe end. The inside diameter of the bell is made sufficiently large to take the spigot end with little clearance between them.

Spigot end 10 is provided with an annular groove 16 by means of a simple grooving tool. Again, this forming of the groove 16 can be done in the field at the time the bell portion 14 is formed. Alternatively, both bell 14 and groove 16 can be formed prior to delivery to the field.

Groove 16 must be formed at a distance from the end of pipe end 10 which is less than the axial length of bell portion 14 of pipe end 12. On the other hand, it is preferable that groove 16 not be formed closely adjacent the pipe end 12, since a uniform buckling of the wall of pipe end 12 in the region of groove 16 is best obtained when groove 16 is spaced from the end.

Figures 2, 3:
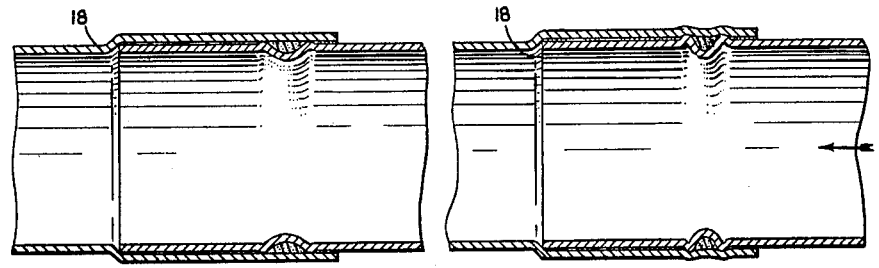
FIGURE 2 is a view similar to FIGURE 1 showing the pipe ends as first telescoped together.
FIGURE 3 is a view similar to FIGURE 2, but showing the final form of the pipe joint resulting from further telescoping of the pipe ends following their arrangement in accord with FIGURE 2.

As a first step in connecting the two pipe ends, they are telescoped together in the manner shown in FIGURE 2. In view of the close spacing between the inside of bell 14 and the outside of spigot end 10, this initial telescoping of the two pipe ends is best achieved by means of a portable hydraulic ram device. Such device can take the form of a pair of annular clamps adapted to tightly engage about both pipe ends, and a hydraulic or pneumatic piston arrangement for forcing the two clamps towards one another. The same apparatus can be readily adapted to accommodate the forming tool referred to above for effecting the bell portion 14 on the pipe end 12. This apparatus can conveniently be mounted on wheels for easy transportation to and from the field, and for movement along the pipe line being laid.

To lend further assistance to the telescoping of the pipe ends, a liquid sealant can be used to coat the inside of bell 14 or the outside of spigot end 10. This sealant thus serves the dual role of acting as a lubricant at the time the joint is formed, and subsequently hardening to fill in minute spaces which might develop between the telescoping ends. A preferred liquid sealant is the epoxy resin known by the trade mark "Nupon A." This is a vinyl epoxy and is combined with an amine catalyst by which it is pigmented, stabilized and cured. This material has the ideal qualities for effecting the lubrication desired as the telescoped ends are connected, and for hardening to an effective sealant.

Following the initial telescoping of the two pipe ends to the stage illustrated in FIGURE 2, the telescoping force is stepped up so that the spigot end 10 buckles in the region of groove 16 as illustrated in FIGURE 3. It will be understood, of course, that in order to achieve this buckling, it is essential that the forward end 18 of spigot end 10 abut against the shoulder 20 of bell 14.

Figure 3A:
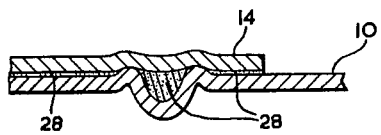
FIGURE 3a is an enlarged detailed view of a portion of FIGURE 3.

Referring now to FIGURE 2a, it will be noticed that the formation of groove 16 in the spigot end 10 also causes very slight annular ridges 24 and 26 to be pushed up on either side of groove 16. In effect, therefore, the actual seal between the spigot end 10 and bell 14 is achieved about the outside surfaces of these ridges 24 and 26. As can be seen in FIGURE 3a, these ridges 24 and 26 are increased in size by the stress set up on the wall of the spigot end 10 as the latter is forcibly rammed against shoulder 20 of bell 14. The sealant 28 fills both the minute spaces as might occur between the spigot end 10 and bell 14, as well as the larger annular space of groove 16, whereby to insure no leakage will occur. It will also be noted that the wall of bell 14 is slightly forced outwardly in the region of the two ridges 24 and 26. Accordingly, the combination of ridges 24 and 26 within these annular ridges in bell 14 serves as an effective lock against withdrawal of pipe end 10 from bell 14.

The joint in accord with this invention is extremely simple and inexpensive compared with the joining methods heretofore available. The only material required other than the pipe wall material itself is the sealant. Beyond this, the only equipment required to effect the joints is the hydraulic or pneumatic apparatus for forcibly telescoping the pipe ends together. This apparatus does not have to be built to particular close tolerances and is not an expensive piece of apparatus.

The foregoing example of the invention describes a pipe joint connecting lengths of aluminum pipe. However, as previously mentioned, the invention is equally adaptable to other types of pipe manufactured of material having a certain amount of malleability. Thus, the invention may be used for everything from small diameter copper tubing to large diameter steel pipe such as may be used in oil pipe lines.

Regardless of the type of pipe concerned, the joint is effected in the same manner in each case, i.e., a bell is formed on one pipe end, a groove is rolled in the other pipe end and the two are forcibly telescoped together as to buckle the spigot end in the manner previously described. In this regard, it is to be further noted that, as the wall of the spigot end is forced radially outwardly in the region of the groove, the bell end is also somewhat radially expanded. This expansion of the bell takes place only in the region of the groove on the spigot end. As a result that portion of the bell which extends from the groove to the mouth of the bell is somewhat tapered. This taper effectively locks the spigot end against withdrawal from the bell. Further, it can be seen that high internal pressures tending to move the spigot from the bell will force the expanded spigot against this taper as to increase the sealing effect between them.

It has been found that while an effective pressure tight seal can be obtained without a sealant, consistent results in this regard do require a sealant. It is believed that if the pipe lengths joined were provided with mirror smooth surfaces, a perfect seal would be obtained every time without a sealant. In practice, however, commercial grade pipe material is not manufactured to such a degree of perfection and the minute surface scratches and pit holes which are formed at the time the pipe is made, or during formation of the joints, must be filled in to obtain a pressure type seal in every joint.

A second preferred sealant is epoxy polyamide resin, commonly referred to as patching putty, and sold under the trade mark "Nupon Type 2." This material contains no volatiles and will set out of contact with air and does not shrink on curing.

To demonstrate the effectiveness of the joint in accord with the invention, representative aluminum and steel pipe joints were formed and subjected to both hydrostatic and tensile tests. In all cases, the tested samples resisted the stresses set up to the capacity of the testing equipment or failed at points other than the joints themselves. Thus, in the case of 2, 3, 4, 5 and 6 inch aluminum pipe, the samples failed by expansion or splitting of the outer ends of the pipe lengths at internal hydrostatic pressures of 1100, 850, 825, 675 and 625 p.s.i. respectively. As stated, failure of the test samples occurred by expansion or splitting of the pipe at the outer ends of the pipe lengths, i.e., at the ends remote from the joints themselves. In all cases, the joints proved stronger than the walls of the pipe and no movement in the joints was noted.

In the case of steel pipe, sample joints were made up from ¾, 1, 1¼, and 2 inch pipe and hydrostatically tested to a p.s.i. load of 7500, this being the capacity of the testing equipment. In no case was there any failure of the pipe or movement of the joint.

Tensile tests were also carried out to determine the force required to pull the joints apart. With 2 inch steel pipe, a force of 31,700 pounds was required. A series of tests were made on aluminum pipe from 2 to 6 inches in diameter. In all cases, the joints withstood the force tending to pull them apart up to the capacity of the testing equipment at 94,200 pounds. No movement in any joint was noted.

As previously stated, the joint in accord with the invention is "self-locking," due to the manner in which the bell end is expanded in the region of groove on the spigot end whereby to gain a reverse taper in the bell. To illustrate this taper, measurements were taken along one side of the bell of a joint made up from 3″ aluminum pipe. The measurements were made by means of a surface plate and a fixed dial indicator graduated in .001″. The joint was passed under the gauge with the following results.

| | Inches |
|---|---|
| At mouth of bell | .033 |
| Between mouth and groove area | .033 |
| Immediately prior to groove area | .036 |
| At groove area | .044 |
| After groove area | .035 |
| At end of bell area | .037 |

An especially strong joint is obtained by this invention when the wall of bell 14 is deformed within its elastic limit by the radial expansion of ridges 24 and 26 against the interior wall of said bell. The deformations formed by the radial expansion of ridges 24 and 26 are in the approximate outline of said ridges and, as pointed out above, are not beyond the elastic limit of the wall of bell 14. It is to be noted that, when the pipe ends 10 and 12 are forcibly telescoped to buckle the spigot end 10 within the bell 14 and thus radially expand the ridges 24 and 26, the width across the mouth of groove 16 and the widths across the bases of said ridges decrease, and the depth of said groove and the height of said ridges respectively increase.

As previously stated, ridges 24 and 26 are first formed, although only slightly so, as the groove 16 is formed. This is true in most cases but under certain conditions these ridges appear not to be formed at all or are formed to an unmeasurable degree. The degree of formation of these ridges (prior to ramming of the pipe sections together) depends on the nature of the pipe material, the wall thickness and the type of grooving device used. It is found, therefore, that with thick walled steel pipe, these ridges are so small as to be unmeasurable. However, in all cases, the subsequent ramming of the pipe sections together causes the annular zones of the spigot which lie immediately adjacent the groove to be forced radially outward.

The following example of a joint between sections of steel pipe illustrates the above mentioned fact that under certain conditions, the ridges 24 and 26 are formed to an unmeasurable degree at the time the groove is formed. However, the example also clearly shows the expansion of the spigot in the region of the groove during the ramming process and the resultant expansion of the bell wall.

A 1¼″ I.D. pipe of schedule 40 Grade B steel was used to make a joint as follows:

(a) A first section 12 of the pipe was expanded at one end to form a bell 14 having an I.D. of about 1.640 inches and a length of about 1.660 inches measured from the free end of the bell to the shoulder 20 joining it to the remainder of the pipe;

(b) A second section 10 of the same type of pipe was worked to form a groove 16 in the outside wall thereof. The width of the groove was about .170 inch, measured across the mouth thereof, and the depth of the groove was about .054 inch, measured from the outer surface of the wall. The center of the groove 16 was about .750 inch from the end 18 of section 10;

(c) The end of second section 10 was cleaned and coated with an epoxy glue and then inserted into the bell 14 of first section 12;

(d) The first and second sections were then pressed together in a longitudinal direction with a force of about 26,000 pounds until deformations appeared on the surface of the bell 14, due to the expansion of the inner pipe end in the region of the groove 16. The deformations formed in the outer surface of bell 14 rose a maximum of about .009 inch above said outer surface. The joint thereafter was cut open to measure the width of groove 16 which was found to be about .153 inch across the mouth; the depth of said groove which was found to be about .062 inch from the outside wall of section 10; the height of ridges 24 and 26 which was found to be about 0.009 inch from the outer surface of section 10.

What is claimed is:

1. A joint between a first pipe and a second pipe, both said pipes being made of a rigid material having malleable characteristics, said first pipe in unassembled position having an end portion formed with an internal shoulder, said second pipe in unassembled position having an end portion slidable within said first pipe end portion, said second pipe end portion in unassembled position having a substantially uniform thickness and having an annular groove the wall of which at least partially extends inwardly of the inside surface of the remainder of said second pipe end portion adjacent said groove whereby said groove is adapted to be buckled upon abutment of the end of said second pipe end portion against said shoulder by insertion of the second pipe end portion within said first pipe end portion and axial forcing of said pipes towards each other to expand the annular outer ends of said groove wall beyond the outside surface of the remainder of said second pipe end portion adjacent said groove to deform the inner wall of said first pipe end portion to form at least one internal annular depression, said second pipe end portion in assembled position having said annular groove in buckled condition with the annular outer ends of said groove extending outwardly beyond the outer surface of the remainder of said second pipe end portion adjacent said groove and each of said annular ends being disposed in said annular depression.

2. Joint as claimed in claim 1 wherein said first pipe end portion in assembled position has two internal annular depressions in its interior surface within each of which one of said annular outer ends of said groove is disposed.

3. Joint as claimed in claim 1 wherein said pipes are made of steel.

4. Joint as claimed in claim 1 wherein said pipes are made of aluminum.

5. Joint as claimed in claim 1 wherein said pipes are made of copper.

6. Pipe joint as claimed in claim 1 wherein said deformation is within the elastic limit of said inner wall of said first pipe.

7. Pipe joint as claimed in claim 1 wherein a sealant is disposed between said said inner wall of said first pipe and said end portion of said second pipe disposed therein.

References Cited by the Examiner

UNITED STATES PATENTS

| | | |
|---|---|---|
| 1,113,574 | 10/14 | O'Brien. |
| 1,802,538 | 4/31 | Rych _____ 285—382.5 X |
| 1,970,513 | 8/34 | Knowland _____ 285—258 X |
| 2,614,827 | 10/52 | Peach et al. _____ 285—382.5 X |
| 2,816,211 | 12/57 | Hutchins _____ 285—382.2 X |
| 3,068,563 | 12/62 | Reverman _____ 285—382.2 X |
| 3,124,874 | 3/64 | Woolley _____ 285—382.2 X |
| 3,129,020 | 4/64 | Bujnowski _____ 285—260 X |

FOREIGN PATENTS 648,887  10/28  France.

CARL W. TOMLIN, *Primary Examiner*.

THOMAS F. CALLAGHAN, *Examiner*.